United States Patent [19]

Ciokajlo

[11] 3,866,415
[45] Feb. 18, 1975

[54] FAN BLADE ACTUATOR USING PRESSURIZED AIR

[75] Inventor: John J. Ciokajlo, Loveland, Ohio

[73] Assignee: General Electric Company, Cincinnati, Ohio

[22] Filed: Feb. 25, 1974

[21] Appl. No.: 445,439

[52] U.S. Cl. ............... 60/226 R, 416/154, 416/157
[51] Int. Cl. ........ F02k 3/02, F01d 7/00, F03b 3/14
[58] Field of Search........... 60/226 R, 262; 416/153, 416/154, 157, 160, 43, 166; 415/130

[56] References Cited
UNITED STATES PATENTS

| | | | |
|---|---|---|---|
| 2,924,281 | 2/1960 | Mergen et al. | 416/43 |
| 3,528,241 | 9/1970 | Venable et al. | 60/226 X |
| 3,672,788 | 6/1972 | Ellinger | 416/43 |

*Primary Examiner*—C. J. Husar
*Assistant Examiner*—Thomas I. Ross
*Attorney, Agent, or Firm*—Derek P. Lawrence; Lee H. Sachs

[57] ABSTRACT

A fan having variable pitch blades is driven by the core engine of a gas turbine. The blades are mounted to a disc for rotation of the blades about their respective axes and the disc is mounted to a fan shaft. The fan shaft is mounted for rotation by a casing. A reversible turbine and an actuation gear are mounted for rotation relative to the fan shaft at opposite ends of a cylindrical portion of the fan shaft. A planetary gear train mounted interiorly of the cylindrical portion transmits rotation of the turbine to the actuation gear at a reduction of 915:1. Pneumatic means, including a pneumatic slip ring, introduces compressor discharge pressure (CDP) air to the turbine to serve as motive fluid. A centrifugal brake means locks the actuation gear in place when CDP air is not being ducted through the pneumatic means.

11 Claims, 4 Drawing Figures

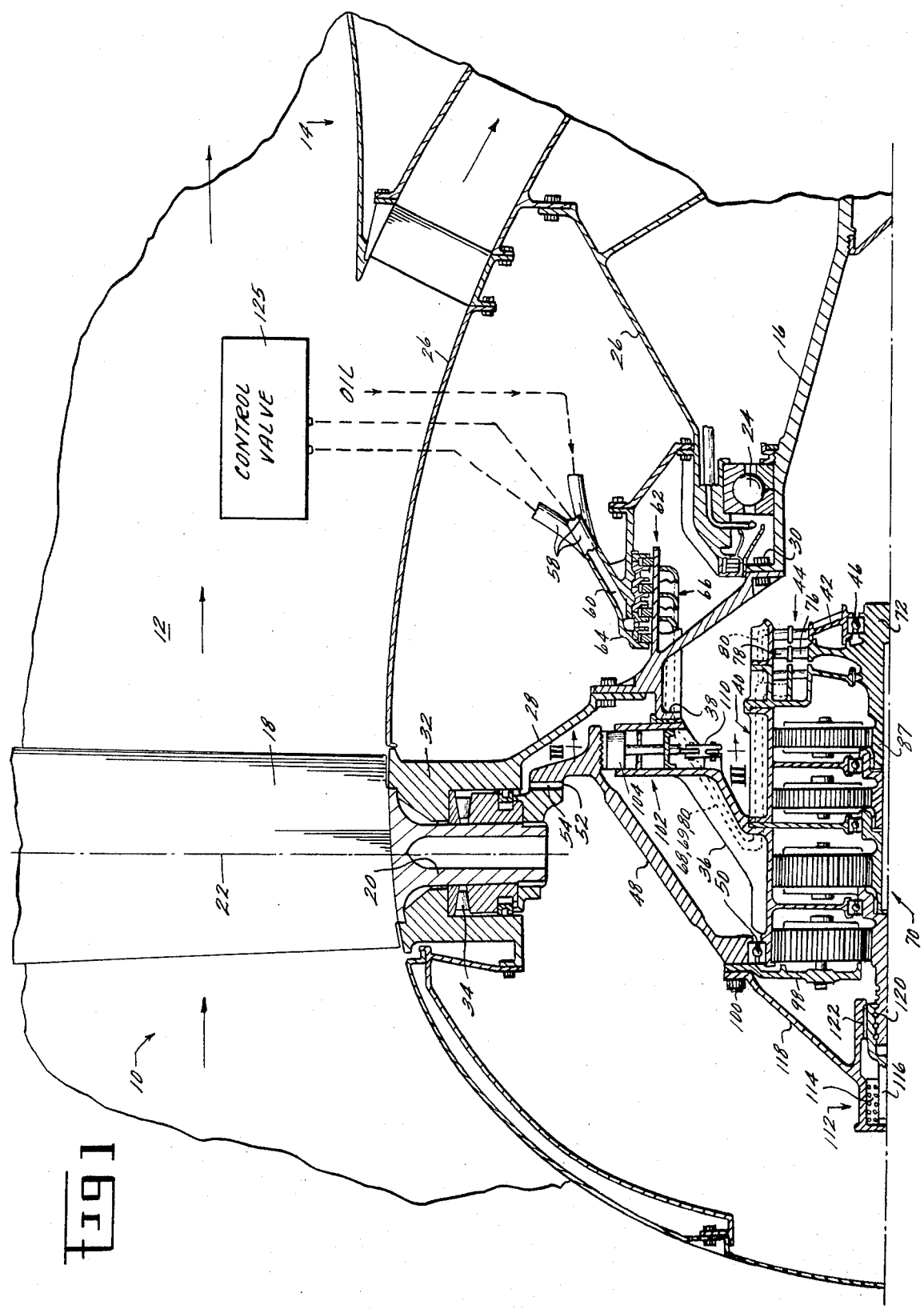

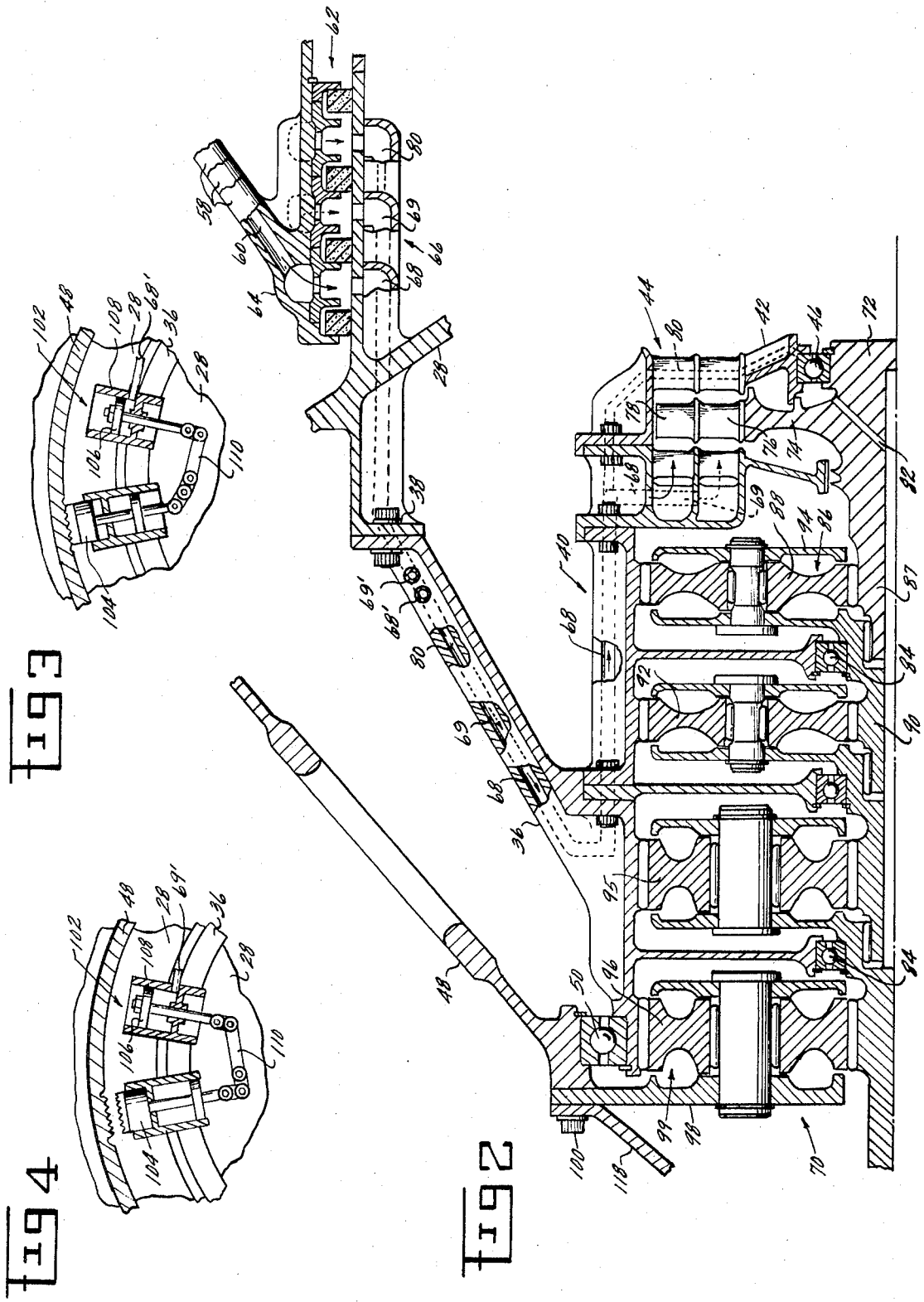

FAN BLADE ACTUATOR USING PRESSURIZED AIR

BACKGROUND OF THE INVENTION

1. Field of the Invention

This invention relates to fans for gas turbines and more particularly to such fans having variable pitch blades.

2. Description of the Prior Art

Those who provide gas turbines for powering aircraft are constantly engaged in findings ways to improve the efficiency of such gas turbines so that greater thrust is available for powering the aircraft at little or no increase in weight in the gas turbine itself. One way to accomplish this result which has been widely recognized is the use of a gas turbine having a core engine and a fan driven by the core engine. Further efficiency is obtained by providing such a fan with variable pitch blading so that the flow characteristics of the fan may be varied in order to optimize fan operation at all modes of flight of the aircraft.

However, in gas turbines having such variable pitch blading, the use of a hydraulic actuator or actuators for providing the necessary actuation force is common in the prior art. A severe problem encountered when using hydraulic actuators is the danger of leakage if the integrity of the hydraulic system is not maintained or sealing is faulty and hydraulic fluid enters the interior of the gas turbine and is exposed to the high temperatures present there.

The leakage of hydraulic fluid presents the danger of a fire in the gas turbine, which can either spread to the aircraft in which the gas turbine is mounted, or cause a malfunction of the gas turbine and therefore a degradation of the amount of propulsive force supplied to the aircraft. This can be serious in the normal flight mode and particularly so in those flight modes where power is critical such as take-off and landing.

The problem of the leakage of hydraulic fluid can be approached in a variety of ways. As to the integrity of the system, expensive and elaborate measures may be taken to prevent the entrance of hydraulic fluid to the gas turbine interior. This is the only way of alleviating the problem since 100 percent reliability cannot be attained with present technology. Sealing may be made more elaborate also, but its performance cannot be guaranteed either. The best solution to the problem is to eliminate the use of hydraulic actuators for providing actuation force and use a fluid which, should system failure occur, does not present a fire hazard. In a gas turbine, where pressurized air is present in abundance, the use of such pressurized air to provide the necessary actuation force presents the best solution to the problem.

SUMMARY OF THE INVENTION

It is a primary object of the present invention to provide simple and reliable variable pitch blading in a fan of the type used in a gas turbine having a core engine driving the fan.

Accordingly, the present invention includes a plurality of variable pitch fan blades which are suitably secured to the fan shaft for rotation therewith. A turbine and an actuation gear are mounted to the fan shaft for rotation relative thereto. The actuation gear cooperates with the variable pitch blades to vary the pitch of the blades in response to the rotation of the actuation gear relative to the fan shaft. A reduction gear means cooperates with the turbine and actuation gear to rotate the actuation gear relative to the fan shaft in response to rotation of the turbine relative to the fan shaft. Pneumatic means introduce air under pressure to the turbine in order to serve as motive fluid for the turbine.

The variable pitch fan of the present invention is provided with a centrifugal brake means which comprises a weight movable radially outwardly, in response to rotation of the fan shaft, to contact the actuation gear to prevent its rotation relative to the fan shaft. A piston cooperates with the pneumatic means to move the weight out of contact with the actuation gear when air is introduced in the turbine.

DETAILED DESCRIPTION OF THE DRAWINGS

A more complete understanding of this invention may be had by reference to the specification when taken in conjunction with the accompanying drawings, wherein:

FIG. 1 is a schematic cross-sectional view of a portion of a fan of the type used in a gas turbine, incorporating the present invention;

FIG. 2 is a detailed view of a pitch change turbine, actuation gear and reduction gear according to the present invention;

FIG. 3 is a cross-sectional view taken along lines III—III of FIG. 1 showing the centrifugal brake means of the present invention in its operative position; and FIG. 4 is a cross-sectional view taken along lines III—III of FIG. 1 showing the centrifugal brake means in its inoperative position.

DETAILED DESCRIPTION OF THE INVENTION

Referring now to FIG. 1, a gas turbine 10 has a fan 12 and a core engine 14 which drives the fan through fan shaft 16. Fan 12 has a plurality of blades 18, each of which includes a blade trunnion 20, each blade and blade trunnion having a common axis 22 about which the blade may be rotated to vary its pitch.

Fan shaft 16 is mounted for rotation by a bearing 24 which is mounted in an annular casing 26 suitably secured to the casing of core engine 14. A disc cone 28 is secured at one end to fan shaft 16, as by bolts 30, and has secured thereto at the other end a disc 32. Blades 18 and blade trunnions 20 are mounted in disc 32 for rotation about their respective axes 22 by suitable bearings 34. A support cone 36 is mounted to disc cone 28, as at flanges 38. Support cone 36 supports a generally cylindrical portion 40 which is attached to the fan shaft 16.

Cylindrical portion 40 includes at its downstream end a radially inwardly extending structural member 42 (see FIG. 2). A reversible turbine 44 cooperates with structural member 42, for rotation relative to cylindrical portion 40, by means of a bearing 46. At the upstream end of cylindrical portion 40, an actuation gear assembly 48 is mounted for circumferential rotation relative to cylindrical portion 40 by a bearing 50. Actuation gear 48 includes face teeth 52 which extend circumferentially around the gear and mesh with pinion gears 54 (only one of which is shown for clarity) each of which is splined or otherwise suitably connected to a corresponding blade trunnion 20. Rotation of actuation gear 48 relative to cylindrical portion 40 and fan shaft 16 thus rotates blade trunnions 20 in unison about their respective axes 22 and thus varies the pitch of blades 18.

A pneumatic means for introducing air under pressure to turbine 44 to serve as the motive fluid for the turbine includes a tube means 58 which is mounted to annular casing 26. A pneumatic slip ring 62 has a first portion 64 which is secured to annular casing 26 and communicates with tube means 58. The other end of tube means 58 is suitably connected to a control valve 125 which is connected to a source of pressurized air, such as the discharge end of the compressor (not shown) of the gas turbine so that compressor discharge pressure (CDP) air is used as the motive fluid for turbine 44. A second portion 66 of pneumatic slip ring 62 is secured to disc cone 28. This portion 66 of the pneumatic slip ring communicates with two ducts 68 and 69 to duct CDP air to reversible turbine 44. In addition, a third duct 80, carries an oil mist for lubrication, as discussed hereinafter.

In order that rotational motion of turbine 44 relative to cylindrical portion 40 and fan shaft 16 may be transferred to actuation gear assembly 48, a reduction gear means 70 is mounted interiorly and intermediate the upstream and downstream ends of cylindrical portion 40.

Referring now to FIG. 2, the pneumatic means, turbine 44 and reduction gear means 70 are shown in detail. Turbine 44 includes a shaft 72 and a turbine disc 74. A first set of turbine buckets 76 are radially spaced from a second set of turbine buckets 78 and are mounted to the outer periphery of disc 74. The first set of turbine buckets 76 are oriented so that introduction of air thereto causes rotation in a first direction, while the second set of turbine buckets are oriented so that introduction of air thereto causes rotation in a second direction. As a result, turbine 44 is a reversible turbine.

Ducts 68, 69 and 80 are part of three separate pneumatic circuits. One of these pneumatic circuits including duct 68 will duct air to first set of turbine buckets 76; a second pneumatic circuit including duct 69 will duct air to second set 78 of turbine buckets; and a third pneumatic circuit including duct 80 will introduce an oil-air mist to bearing 46 in order to provide lubrication therefor and through passage 82 in order to provide lubrication for reduction gear means 70.

Tube means 58 will generally include three sets of tubes in corresponding communication with the three pneumatic circuits of ducts 68, 69 and 80 through pneumatic slip ring 62. Pneumatic slip ring 62 will be constructed to introduce air from corresponding tubes of tube means 58 to corresponding pneumatic circuits of the ducts in a manner which will be easily recognized by those skilled in the art.

Reduction gear means 70 is a planetary gear train having four planetary gear members, each mounted interiorly of cylindrical portion 40 and fan shaft 16 by bearings 84. The sun gear 87 of first planetary gear member 86 is attached to shaft 72 of turbine 44 and meshes with planet gears (only one of which is shown for clarity) 88 of first planetary gear member 86. The sun gear 90 of second planetary gear member 92 is an extension of a cage 94 which is rotatably secured to the center of rotation of planet gear 88. The rotation of succeeding planetary gear members 95 and 96 is similarly accomplished. A cage 98, which is rotatably secured to the center of rotation of planet gear 96 of fourth planetary gear cage 99, is secured to actuation gear assembly 48, as by bolts 100. Each of planetary gear members 88, 92, 95 and 96 have a gear reduction of 5.5 to 1, thus providing an overall gear reduction from turbine 44 to actuation gear assembly 48 of 915:1.

Referring now to FIGS. 1, 3 and 4, a centrifugal brake means 102 is shown. Centrifugal brake means 102 includes two braking mechanisms, one of which is shown in detail in FIGS. 3 and 4. Centrifugal brake means 102 is secured to support cone 36 and includes a weight 104 which is movable radially; and when weight 104 contacts actuation gear assembly 48, centrifugal brake means 102 is in its operative position. A piston 106 which is movable radially in a cylinder 108 cooperates with duct means 68 and 69 by ducts 68' and 69'. As piston 106 is moved radially outwardly, a linkage 110 moves weight 104 radially inwardly (FIG. 4) and out of contact with actuation gear 48, which places centrifugal brake means 102 in its inoperative position and allows actuation gear 48 to rotate relative to fan shaft 16. The cooperation of piston 106 and duct means 68 and 69 moves weight 104 out of contact with actuation gear 48 when air is introduced from duct means 68 and 69 through ducts 68' and 69' at pressure sufficient to overcome the centrifugal load of weight 104.

In operation, fan shaft 16 is rotating and providing additional thrust to gas turbine 10 due to the rotation of fan blades 18. When it is desired to vary the pitch of fan blades 18, CDP air is introduced through tube means 58 into one of the two sets of tubes. Pneumatic slip ring 62 transmits the CDP air into the corresponding pneumatic circuit of duct means 68 and 69. Depending upon which pneumatic circuit is utilized, the CDP air is introduced to one of the sets of buckets 76 or 78 of reversible turbine 44 which rotates with respect to fan shaft 16. The rotation of reversible turbine 44 causes actuation gear 48 to rotate with respect to fan shaft 16. The rotation of actuation gear 48 is much slower than that of reversible turbine 44 because of the 915:1 reduction ratio of reduction gear means 70.

A suitable control valve 125 may be provided wherein CDP air is selectively introduced to the tubes of tube means 58 and therefore selectively to the pneumatic circuits of duct means 68 and 69 so that air is selectively introduced to either first set of turbine buckes 76 or second set of turbine buckets 78 to control the direction of rotation of turbine 44 relative to fan shaft 16.

Since pistons 106 cooperate with duct means 68 and 69 through ducts 68' and 69' whenever sufficient CDP air is introduced into duct means 68 and 69, weight 104 is moved radially inwardly and out of contact with actuation gear assembly 48. This permits the rotation of actuation gear 48 while CDP air is being introduced to reversible turbine 44. When the pitch of blades 18 reaches the desired angle, CDP air is shut off at the control valve 125 and actuation gear 48 ceases rotation with respect fo fan shaft 16. Since CDP air is no longer introduced to duct means 68 and 69, weight 104 is no longer held out of contact with actuation gear 48. It then moves radially outwardly under centrifugal force to contact actuation gear 48 and "lock" blades 18 in their new position. The provision of the centrifugal brake means also introduces a "fail-safe" element to the fan of the present invention since failure of the pneumatic circuit will automatically result in a locking of blades 18 into their presently occupied position.

An LVDT (linear variable displacement transformer) is provided which measures the amount of rotation of actuation gear 48, relative to the amount of rotation of the sun gear of fourth planetary gear member 99. LVDT 112 is of the type well known in the art having a first coil set mounted on an outer cylinder 114 and a second coil set mounted on a member 116 disposed with outer cylinder 114 and axially movable relative thereto. Outer cylinder 114 is secured to actuation gear assembly 48 by conical support 118. Member 116 is moved axially with respect to the actuation gear assembly by ball screw 120 in response to rotation of the sun gear of fourth planetary gear member 96. A spline joint 122 prevents rotation of member 116 relative to the actuation gear assembly. Such relative axial movement produces an electrical output signal from the coils mounted on member 116, the amplitude of which is proportional to the amount of relative axial movement, and the phase of which represents the direction of relative axial movement from a center position. LVDT is calibrated so that the position of blades 18 is indicated according to the amplitude and phase of the output signal of the LVDT.

Although one specific embodiment of the invention has been shown, those skilled in the art will perceive modifications other than those specifically pointed out which can be made without departing from the invention, and it is intended by the appended claims to cover all such modifications as fall within the true spirit and scope of the invention.

For example, the reversible pitch change turbine illustrated herein is a two-stage, axial flow turbine. The same effect can be accomplished by the use of a single stage radial flow turbine having opposed air inlets.

What is claimed as new and desired to be secured by Letters Patent of the United States is:

1. In a fan of the type used in a gas turbine engine having a core engine driving the fan through a fan shaft;
   a. a plurality of variable pitch fan blades secured to said fan shaft for rotation;
   b. a pitch change turbine mounted to said fan shaft for rotation relative thereto;
   c. an actuation gear mounted to said fan shaft for rotation relative thereto wherein said actuation gear cooperates with said variable pitch blades to vary the pitch of said blades in response to rotation of said actuation gear relative to said fan shaft;
   d. reduction gear means cooperating with said turbine and said actuation gear to rotate said actuation gear relative to said fan shaft in response to rotation of said turbine relative to said fan shaft;
   e. pneumatic means for introducing air under pressure to said turbine to serve as the motive fluid of said turbine; and
   f. control means to selectively regulate the flow of motive fluid to said turbine.

2. The fan recited in claim 1 wherein said fan shaft includes:
   a. a disc for mounting said blades for rotation about their respective axes whereby their pitch is varied; and
   b. a generally cylindrical portion coaxial with said fan shaft wherein said turbine, said actuation gear and said reduction gear means are mounted to said cylindrical portion for rotation relative thereto.

3. The fan recited in claim 2 wherein:
   a. said cylindrical portion of said fan shaft has a downstream end for mounting said turbine, an upstream end for mounting said actuation gear, and an intermediate portion; and
   b. said reduction gear means comprises a planetary gear train disposed interiorly of and cooperating with said intermediate portion of said cylindrical portion of said fan shaft for transmitting rotation of said turbine to said actuation gear.

4. The fan recited in claim 1 wherein said turbine is a reversible turbine.

5. The fan recited in claim 4 wherein said turbine includes:
   a. a first set of turbine buckets for rotation of said turbine in a first direction in response to the introduction of air under pressure to said first set; and
   b. a second set of turbine buckets spaced radially from said first set for rotation of said turbine in a second direction in response to the introduction of air under pressure to said second set.

6. The fan recited in claim 5 wherein said pneumatic means includes:
   a. a first pneumatic circuit for selectively introducing air under pressure to said first set of turbine buckets; and
   b. a second pneumatic circuit for selectively introducing air under pressure to said second set of turbine buckets.

7. The fan recited in claim 6 wherein said core engine includes a compressor, and said air under pressure is air discharged from said compressor.

8. The fan recited in claim 1 wherein each said blade includes a blade trunnion coaxial with said blade and each said blade trunnion includes a pinion gear and said actuation gear includes circumferentially extending face teeth meshing with said pinions for rotation of said blades about their respective axes in response to rotation of said actuation gear with respect to said fan shaft.

9. The fan recited in claim 1 further including centrifugal brake means mounted to said fan shaft and having an operative position wherein said centrifugal brake means restrains said actuation gear against rotation relative to said fan shaft and an inoperative position freeing said actuation gear for rotation relative to said fan shaft wherein said centrifugal brake means cooperates with said pneumatic means so that said inoperative position is occupied when air is introduced to said turbine.

10. The fan recited in claim 9 wherein said centrifugal brake means comprises at least one braking mechanism including:
    a. a weight movable radially outwardly under centrifugal force to contact said actuation gear when said centrifugal brake means occupies said operative position; and
    b. a piston cooperating with said weight and said pneumatic means to move said centrifugal brake means to said inoperative position, wherein said weight is moved radially inwardly and out of contact with said actuation gear when air is introduced to said turbine.

11. The fan recited in claim 10 further including an annular casing for mounting said fan shaft for rotation wherein said pneumatic means comprises:
    a. tube means mounted to said annular casing;

b. a pneumatic slip ring communicating with said tube means;

c. duct means mounted to said fan shaft in communication with said pneumatic slip ring and said turbine for ducting said air under pressure from said pneumatic slip ring to said turbine, wherein said piston cooperates with said duct means.

* * * * *